C. A. LANG.
DEVICE FOR DUSTING TREES WITH DRY SULPHUR.
APPLICATION FILED AUG. 23, 1921.
1,427,743.
Patented Aug. 29, 1922.
2 SHEETS—SHEET 2.
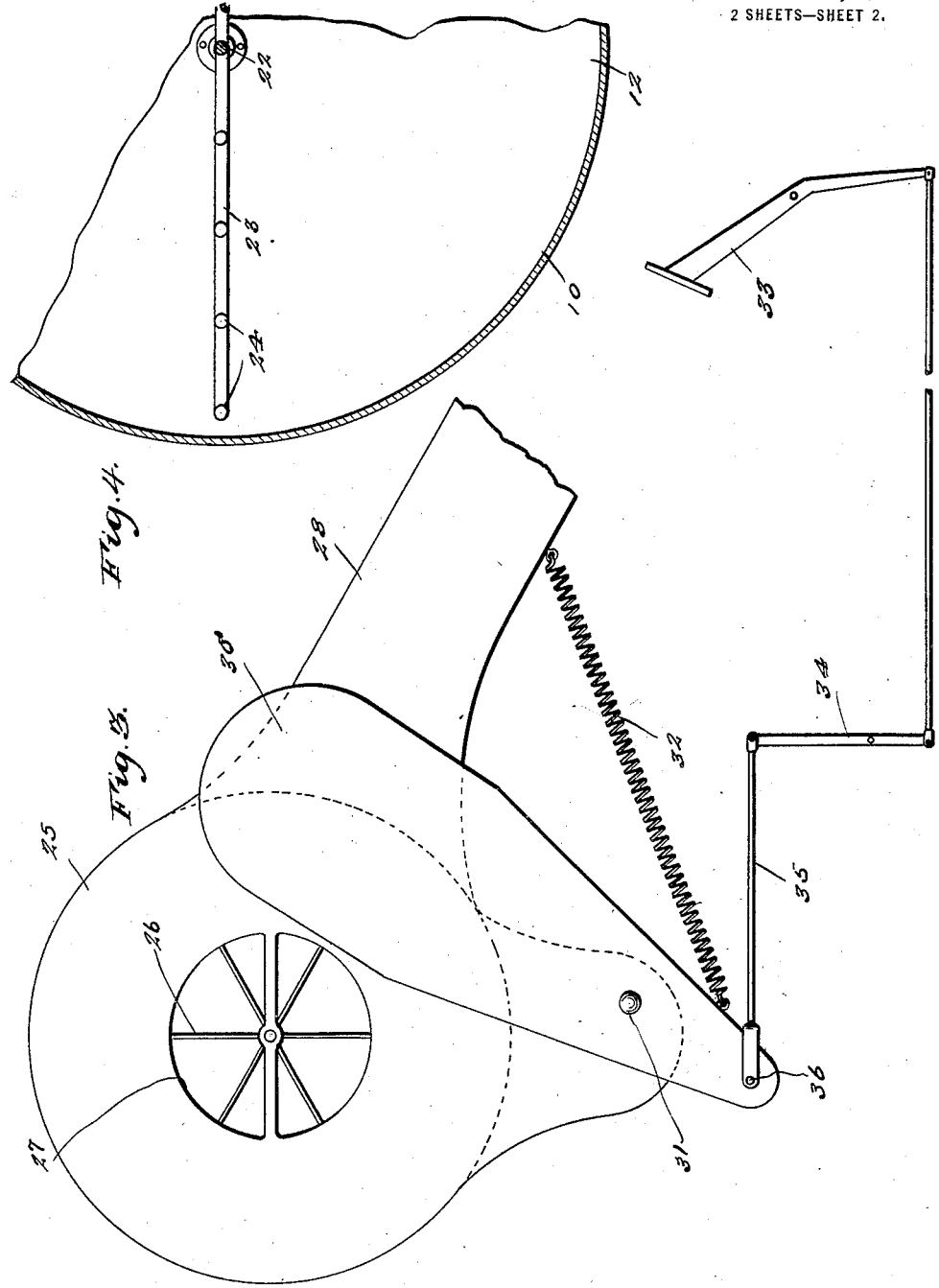

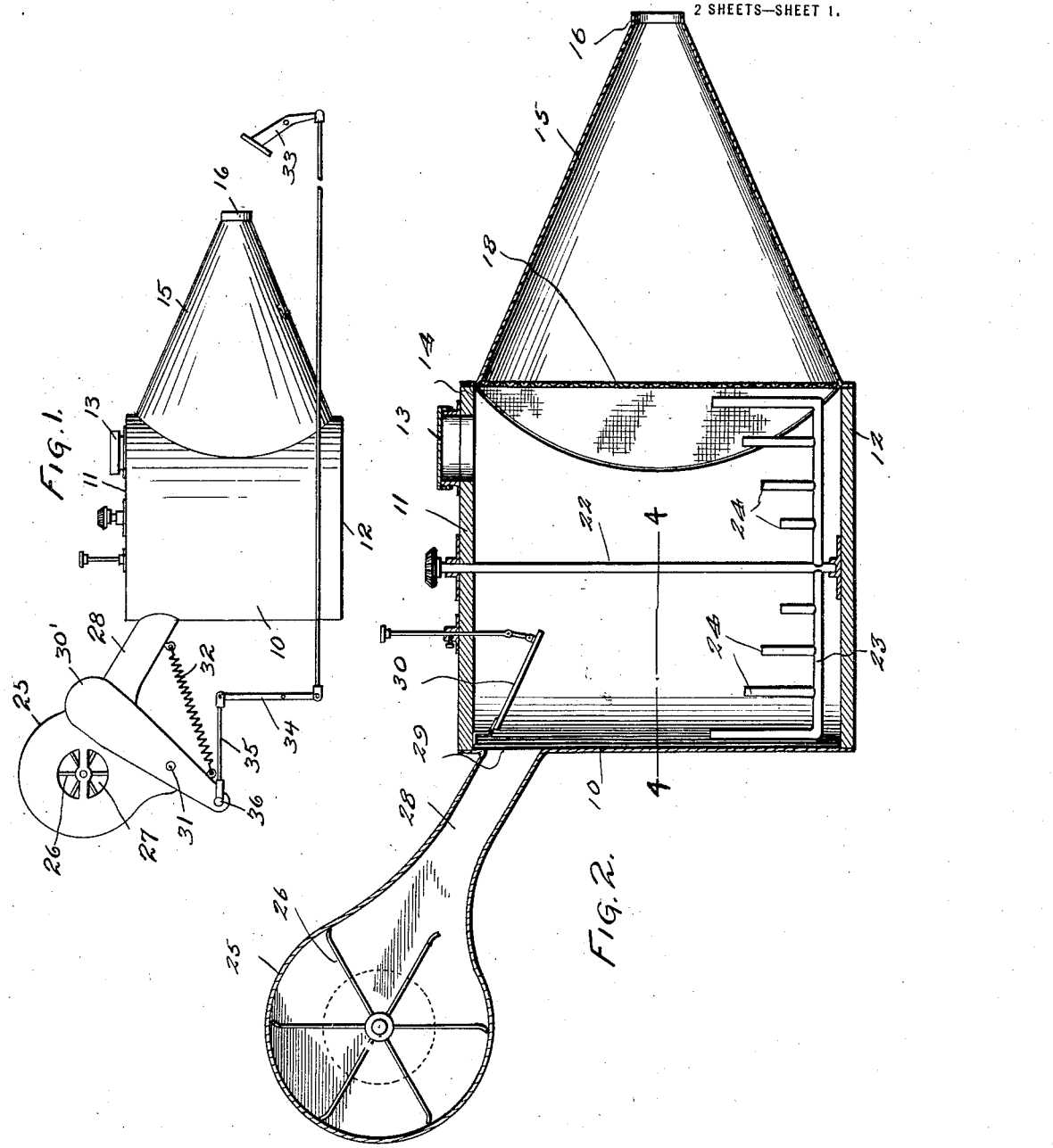
C. A. LANG.
DEVICE FOR DUSTING TREES WITH DRY SULPHUR.
APPLICATION FILED AUG. 23, 1921.
1,427,743. Patented Aug. 29, 1922.
2 SHEETS—SHEET 1.

UNITED STATES PATENT OFFICE.

CHARLES A. LANG, OF SELMA, CALIFORNIA, ASSIGNOR OF ONE-HALF TO NEWTON D. HURSH, OF OAKLAND, CALIFORNIA.

DEVICE FOR DUSTING TREES WITH DRY SULPHUR.

1,427,743.

Specification of Letters Patent. Patented Aug. 29, 1922.

Application filed August 23, 1921. Serial No. 494,663.

*To all whom it may concern:*

Be it known that I, CHARLES A. LANG, a citizen of the United States, residing at Selma, in the county of Fresno and State of California, have invented new and useful Improvements in Devices for Dusting Trees with Dry Sulphur, of which the following is a specification.

This invention relates to a device for distributing dry sulphur in the operation of "dusting" vines and trees, and it is especially intended for preventing mildew and for destroying the red spiders.

The object is to provide for the agitation and breaking up of the dry sulphur in a hopper to be mounted on a motor propelled vehicle, or merely mounted on wheels, the dry material being blown through a screen, and then through any nozzle suitable for the purpose.

A further object is to provide a particular arrangement or combination of blower, agitators and screens, the first two elements named being driven from the same gearing.

A still further object is to provide for discontinuing the distribution of the material without stopping the blower, and for regulating the force of the air blast directed on the loose or other material in the hopper.

With the foregoing and other objects in view, the invention consists in the novel construction, and arrangement of elements described and claimed, it being understood that modifications may be made in the construction within the scope of the claims, without departing from the spirit of invention.

The device herein described is adapted for use when mounted on a motor vehicle and driven from the power unit thereof, but it is also adapted for use under other conditions, and in the drawings I have illustrated the device per se, that is exclusive of the mounting or driving means.

Figure 1 is a view of the device in side elevation.

Figure 2 is a view in vertical section.

Figure 3 is a view in side elevation of the fan casing and the valve controlling the air inlet thereof.

Figure 4 is a fragmentary view in horizontal section through the hopper, and showing a portion of the agitator.

The hopper may be of cylindrical form if desired, and formed of sheet metal, the upper and lower elements 11 and 12 being of wood in the present instance, and the element 11 being provided with a filling opening closed by a cap 13.

One side of the hopper, or the front thereof, is open, so far as the sheet metal wall is concerned, the opening being designated 14 and having communication with a tapered member 15 through which the material is blown. The outer portion 16 of the element 15 is adapted for connection with a flexible discharge member having a suitable nozzle.

A concave screen 18 is connected at its edge portions with the wall of the hopper, and corresponds in size with the opening in said wall. The concaved surface is toward the outer side.

A central vertical shaft 22 carries an agitator 23 including the upwardly projecting teeth 24, designed to break up the lumps of sulphur, so that the powdered portion may be blown off and discharged through the screen.

The blower includes a casing 25 and a fan 26, the casing having a central inlet opening 27. In communication with the casing is a pipe or spout 28 and the latter conducts the air into the hopper 10 through the opening 29. A hinged valve 30 controls the discharge of air through the opening 29 in order to regulate the current of air being discharged toward the mass of powdered material and acting to force this material through the screen.

The opening 27 in the fan casing is controlled by a valve 30' designed to close the air inlet or partially close the latter. This valve is especially useful in discontinuing the blast through the hopper without discontinuing the drive, and thereby effecting a considerable saving in material when the operator is passing from one row to another. The valve is mounted on pivots 31, and is partly controlled by a spring 32 connected as shown. A pedal 33 mounted in any suitable position controls an arm 34, the latter having connection through element 35 with the valve at the point 36.

The two valves are especially important, since it is not only possible to regulate the air intake through the fan casing, but with a given volume of air admitted at this point it is possible by means of valve 30 which acts partly as a deflecting device to direct the air current at different angles with reference to the surface of the material in the hopper, so that a less quantity of material may be distributed under the same pressure or with an increased pressure, when circumstances require.

What is claimed is:

1. A device of the class described, comprising a hopper having an opening in the wall thereof, a screen mounted on the said opening, an agitator and means for mounting the latter in the lower portion of the hopper, means for introducing air under pressure to the casing, means for regulating the pressure, and means for controlling the direction in which the air current is discharged, said means last mentioned comprising a hinged element movable to a variable extent in the path of the air current.

2. A device of the class described, comprising a hopper having a discharge opening, a screen mounted opposite the opening, an agitator mounted in the lower portion of the hopper, means for introducing air under pressure to the casing, means for controlling the air pressure, said means being mounted outside of the casing, the controlling means being normally inoperative, and a controlling device within the hopper operable at will, for varying the direction of the air current admitted to the hopper.

3. A device of the class described, comprising a hopper having a discharge opening, a fan casing, a pipe connecting the casing with the hopper, a fan in the casing, means for driving the fan, a valve controlling the air current through the casing independently of the drive, and means within the hopper controlling the direction of the air current admitted thereto, with reference to a body of material in the hopper and devices for retaining the means last named in various adjusted positions.

In testimony whereof I affix my signature.

CHARLES A. LANG.